(12) United States Patent
Heise

(10) Patent No.: US 6,891,901 B2
(45) Date of Patent: May 10, 2005

(54) DATA TRANSMISSION DEVICE

(75) Inventor: Bernd Heise, München (DE)

(73) Assignee: Infineon Technologies, AG, Munich (DE)

(*) Notice: Subject to any disclaimer, the term of this patent is extended or adjusted under 35 U.S.C. 154(b) by 187 days.

(21) Appl. No.: 10/181,398

(22) PCT Filed: Jan. 3, 2001

(86) PCT No.: PCT/EP01/00021
§ 371 (c)(1),
(2), (4) Date: Oct. 31, 2002

(87) PCT Pub. No.: WO01/52491
PCT Pub. Date: Jul. 19, 2001

(65) Prior Publication Data
US 2003/0118124 A1 Jun. 26, 2003

(30) Foreign Application Priority Data
Jan. 14, 2000 (DE) .......................................... 100 01 368

(51) Int. Cl.[7] .............................. H04B 3/00; H04L 25/00
(52) U.S. Cl. ...................................... 375/296; 375/258
(58) Field of Search ...................... 375/296; 379/399.01, 379/413

(56) References Cited

U.S. PATENT DOCUMENTS

| 4,839,905 A | 6/1989 | Mantovani ................... 375/12 |
| 5,146,476 A | 9/1992 | Whitehead et al. ........... 375/98 |
| 5,329,588 A | * 7/1994 | Willocx et al. ............. 379/413 |
| 5,585,763 A | 12/1996 | Navabi et al. .............. 330/255 |
| 5,856,758 A | 1/1999 | Joffe et al. ..................... 330/85 |
| 6,661,894 B1 | * 12/2003 | Heise ..................... 379/399.01 |

FOREIGN PATENT DOCUMENTS

| DE | 199 16 635 C1 | 1/2001 |
| EP | 0 455 893 A1 | 11/1991 |

OTHER PUBLICATIONS

Tietz, Dr. Ulrich, Schenk, Dr. Christoph, "*Halbleiter–Schaltungstechnik*", paragraph 16.3.6, 1980.

* cited by examiner

Primary Examiner—Stephen Chin
Assistant Examiner—Harry Vartanian
(74) Attorney, Agent, or Firm—Holme Roberts & Owen LLP

(57) ABSTRACT

An output signal to be transmitted via an especially two wire transmission line (A, B), which is composed of a transmission signal and a DC supply voltage, is generated by a data transmission device especially designed in the form of a SLIC circuit. Using a control circuit (5-8), which tracks the DC supply voltage on the output side of the transmission device (1-3) in such a manner that the level of the DC supply voltage does not decrease, it is possible to ensure that both the specified requirements concerning the maximally admissible DC voltage drop as well as the specified requirements concerning the reflection attenuation are met.

8 Claims, 3 Drawing Sheets

State of the art

DATA TRANSMISSION DEVICE

This invention relates to a data transmission device to generate an output signal to be transmitted via a transmission line, which is composed of a transmission signal and a DC supply voltage.

Data transmission devices must meet specific requirements in regard to the electric properties concerning their connection terminals.

Such requirements are for example detailed in "ETSI Technical Report ETR 080", September 1995, European Telecommunications Standards Institute, Sophia-Antipolis, France. According to this document for ISDN-Uk0 two wire transmission with 2B1Q-encoding (that is to say two bits produce a quaternary symbol) it is laid down for example that the transmission signal of the data transmission device when transmitting +3-pulses against a resistance of 135Ω a voltage of 2.5V±5% must be generated. Furthermore between the terminals of the data transmission device in a frequency band of 10 kHz–40 kHz with the resistance of 135Ω the reflection attenuation must be more than 20 dB. This corresponds to an input resistance of 110.5Ω–165Ω. For ISDN-Uk0 two wire transmission with 4B3T-encoding (that is to say four bits produce three tertiary symbols), as demanded for example in the telecommunications network of Deutsche Telekom AG, it is required that the transmission signal of the data transmission device when transmitting +1-pulses against a resistance of 150Ω, must generate a voltage of 2V±10%. Between the terminals of the data transmission device in the case of the resistance of 150Ω the reflection attenuation must be more than 16 dB. This corresponds to an input resistance of 109Ω–206Ω.

These requirements in the case of known data transmission devices are met by a low-ohm output signal being generated and precise series resistors being used at the outputs of the data transmission device.

Figure 3:
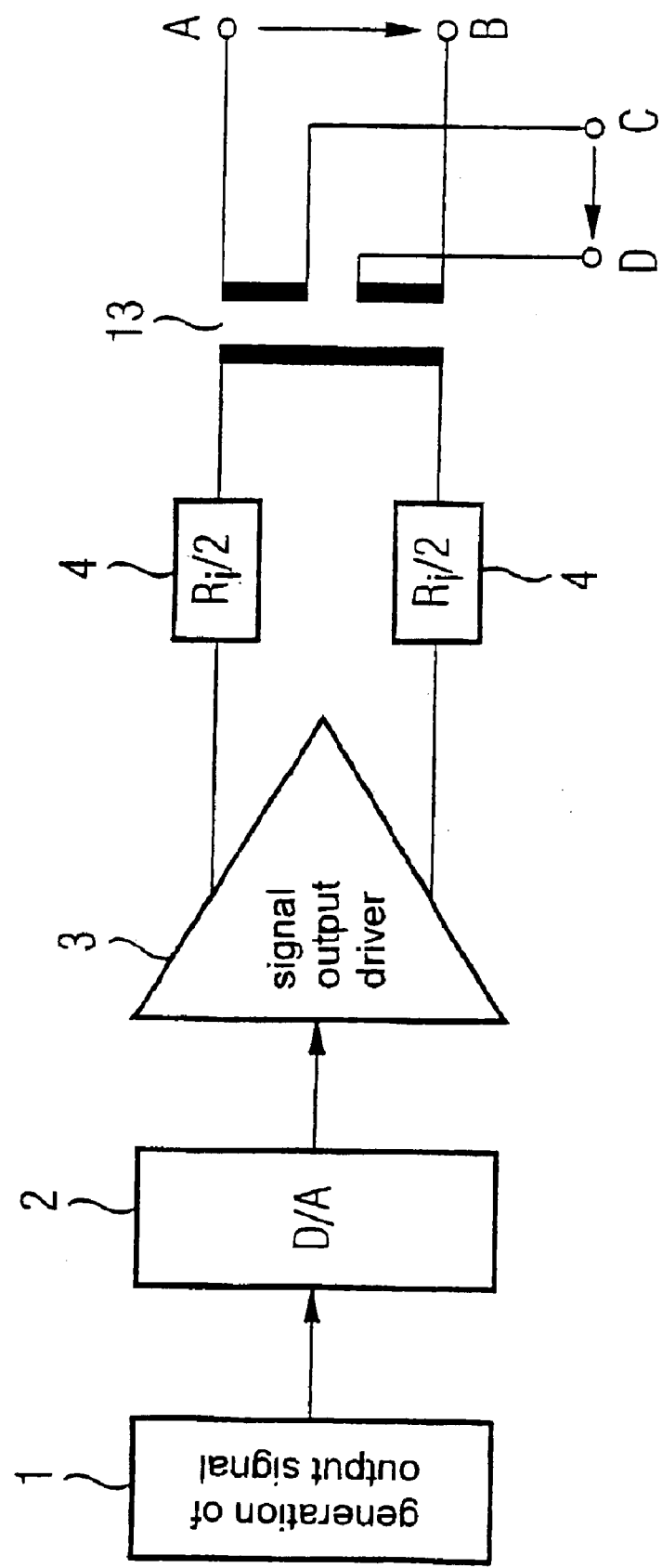

Such a known data transmission device is for example illustrated in FIG. 3. A transmission signal generating device 1 generates a digital transmission signal, which is converted by a digital-to-analog (D/A) converter 2 into an analog transmission signal and is fed to an output driver 3. From the output driver 3 the analog transmission signal is transmitted in the form of two split signals via two wires of a transmission line, whereby the alternating current (AC) current-related difference of the two split signals corresponds to the desired transmission signal. The series resistance Ri, which corresponds to the internal resistance of the data transmission device, is normally distributed for reasons of symmetry onto two resistors 4, whereby in each case one resistor is allocated to one line wire i.e. one of the differential outputs of the output driver 3. A supply voltage lying between terminals C and D is fed in for the recipient of the transmission signal via a transformer 13 which is independent of the transmission signal, so that the transmission signal combined with the supply voltage appears at the terminals A and B of the data transmission device.

Apart from the data transmission devices described above, which work with transformers and are preferably used in broad band data systems, normally particularly in analog speech systems transformer-less electronic solutions are employed, which involve so-called subscriber interface- or SLIC-circuits ("Subscriber Line Interface Circuits") as the interface for the transmission or telephone-line. The direct current (DC) supply necessary for the individual subscriber or recipient in analog systems is also provided via these SLICs.

In the case of such generic data transmission devices with SLIC-circuits the DC supply voltage is not fed in via a transformer 13 after the series resistors 4 on the output side, but are given out by the output driver together with the transmission signal. This results in the fact that not only the signal current, but also the supply current flows via the series resistors 4, which results in a corresponding DC-voltage drop at the series resistors 4.

Many telecommunication network operators specify a maximum DC-voltage drop, which must be left with the maximum possible supply current. The value of the series resistors 4 is limited upwards as a result of this value for the maximally admissible DC-voltage drop. In particular as a result of this requirement a lower value Ri/2 for the series resistors 4 is needed than would be necessary for the reflection attenuation demanded. Thus for example in the area of Deutsche Telekom AG a voltage drop of maximum 3V is permitted. The voltage drop however is 6.75V in the case of a required supply current of at least 45 mA at a 150Ω series resistor, which corresponds to more than double the permitted voltage drop.

The present invention is therefore based on the objective of creating a transformer-less data transmission device, with which the requirements concerning the maximally admissible DC voltage drop can also be met.

This objective is achieved according to the invention by a data transmission device with the features of claim 1. The sub-claims in each case describe preferred and advantageous embodiments of the present invention.

According to the invention a control circuit or control loop is used, which ensures that the DC voltage on the output side does not decrease, which in regard to the DC-signal corresponds to negative input resistance (for instance in the same magnitude of the particular series resistor). The control circuit in this case includes a voltage measurement device to measure the DC voltage drop and an adding device, in order to add the DC-voltage drop recorded to the transmission signal.

Since with SLIC technology both the supply voltage as well as the voltage of the actual transmission signal occurs at the output of the data transmission device, preferably a filter device is used, which separates the DC voltage from the measured output voltage of the data transmission device for further processing. To this end for example a digital low pass filter device can be used as the filter device. By using digital filtering with programmable filter coefficients with the aid of the system software the size of the negative internal resistance as well as the limit frequency for example can be variably adjusted and therefore the system can be optimized to the demands of the various network operators for this purpose without having to make changes in the system hardware.

The invention briefly described above is preferably implemented in the form of a fully integrated solution, whereby the addition of the recorded DC-voltage to the transmission signal can be digital or analog. As a result of full integration a minimum chip-space requirement can be achieved. Alternatively the invention can also be realized in the form of an analog circuit, whereby however the circuit complexity in comparison to the fully integrated solution is considerably greater. In particular in the case of an analog circuit the use of large time constants is necessary, for which discrete components designed accordingly, such as in particular large capacitors, are required in order to meet the necessary precision.

With the aid of the present invention both the requirements concerning the maximally admissible DC-voltage drop as well as the requirements concerning AC series resistance i.e. AC internal resistance, that is to say reflection attenuation, can be met. The invention therefore for the first time solves the problem associated with the use of SLIC circuits with permanent supply voltage described at the start.

The invention can generally be used in a transmission- or telephone line wherever a remote supply voltage is required and at the same time transmission signals have to be fed onto the transmission line without use of a transformer. This applies in particular for transmission systems with two-wire transmission lines, in the case of which the split signals transmitted via the two wires of the transmission line with high accuracy although of equal size have to be inverse to each other. The invention is therefore specially suitable for use in ISDN-telephone lines ("Integrated Services Digital Network"). Generally the invention for example is suitable for the following signal transmission systems: 2B1Q-encoding, 4B3T-encoding, Up0/UPN-ISDN, SO-ISDN, MDSL("Multirate Digital Subscriber Line"), SDSL("Single Pair of Symmetric Digital Subscriber Line"), VDSL("Very High Bit Rate Digital Subscriber Line"), ADSL ("Asynchronous Digital Subscriber Line") etc.

If the invention is used in data transmission devices for two-wire transmission lines common control for the two line wires can be provided, as a result of which the chip space requirement can be reduced further. Equally for each line wire separate control is also possible, whereby the control circuit according to the invention in this case for low-frequency synchronous signals (with a frequency for example of 16.6 Hz or 50 Hz) represents minimum internal resistance, so that the sensitivity of the data transmission can be reduced compared to synchronous signals of the transmission line.

The present invention is explained in more detail below with reference to the drawing by way of preferred embodiments.

Figure 1:
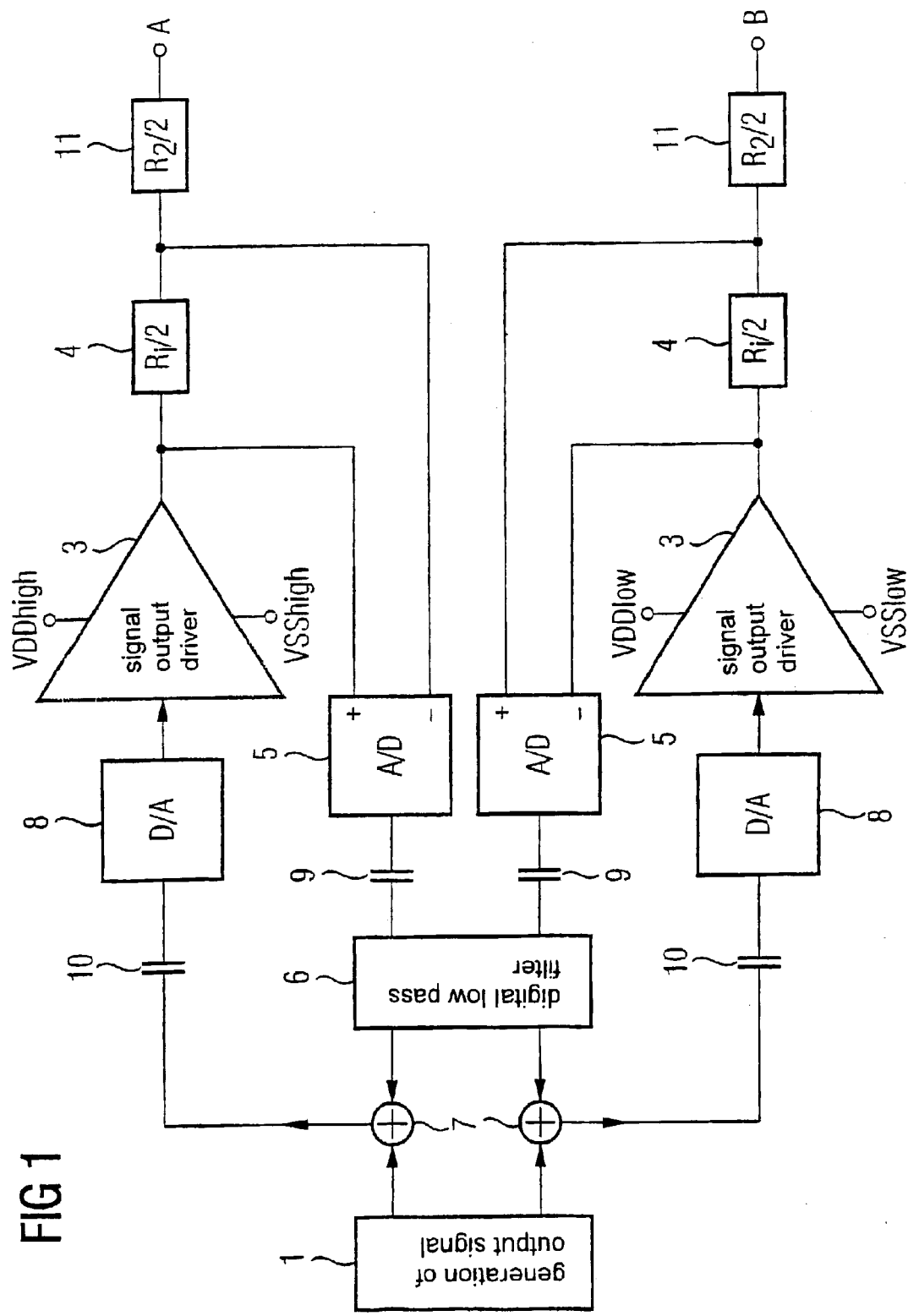
Figure 2:
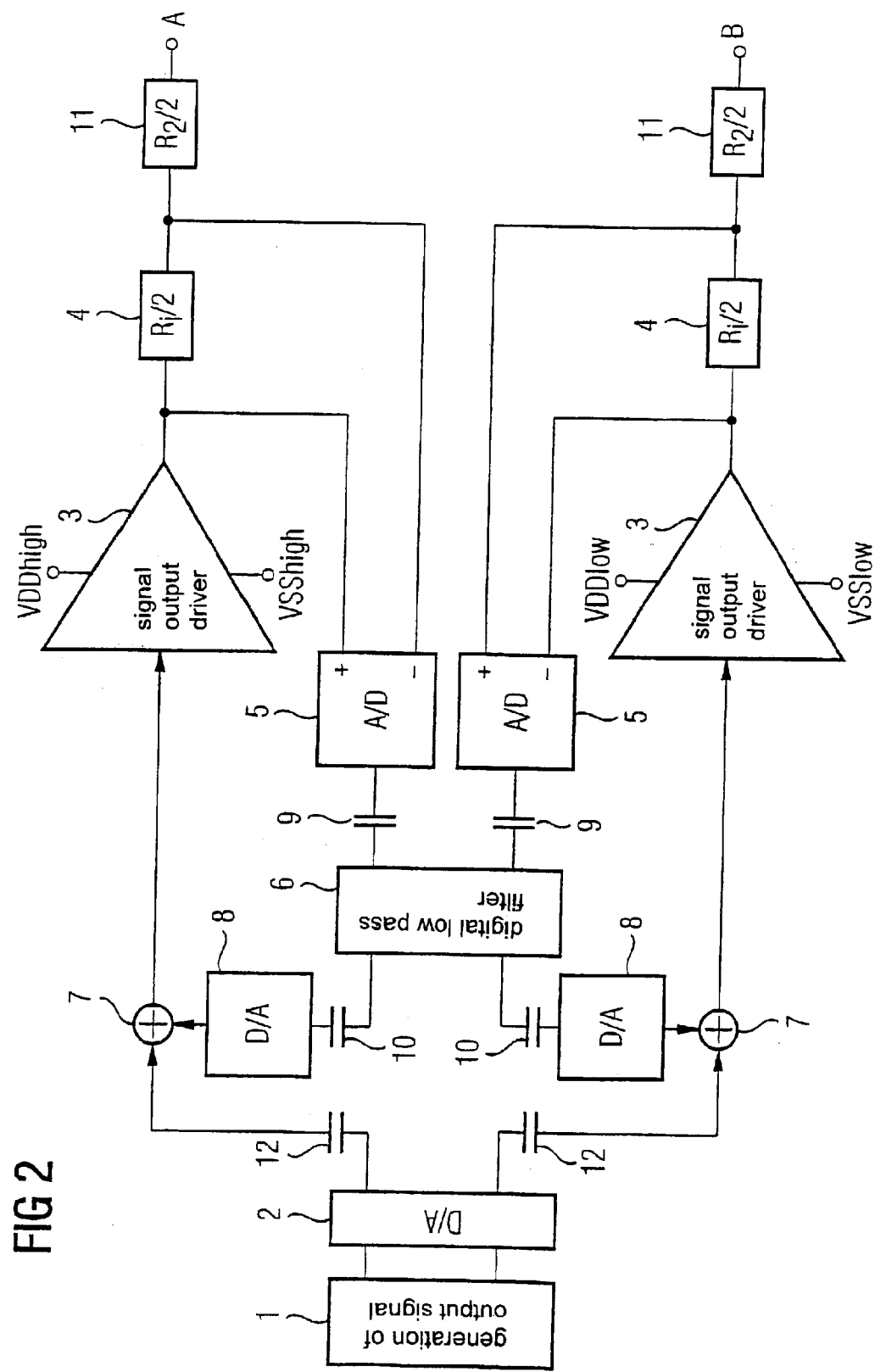

FIG. 1 shows a data transmission device according to a first embodiment of the present invention, FIG. 2 shows a data transmission device according to a second embodiment of the present invention, and FIG. 3 shows a known data transmission device, in the case of which the supply voltage is fed in via a transformer.

The data transmission device shown in FIG. 1 includes a transmission signal-generating device 1 to generate a digital transmission signal. The digital transmission signal is generated in the form of two digital split signals, whereby the AC current-related difference of the two split signals corresponds to the transmission signal. Each split signal is fed via a D/A converter 8 to a corresponding output driver 3, whereby each output driver 3 is allocated to one wire of the two-wire telephone or transmission line. The two output drivers 3 work in opposite directions with push pull-operation, as a result of which it is ensured that each split signal is fed to the output driver 3 allocated in each case as well as the line wire allocated in each case.

The two output drivers lie on different voltage levels. The output driver 3 allocated to the terminal A gives out a voltage between VDDhigh and VSShigh, while the output driver 3 allocated to the terminal B gives out a voltage between VDDlow and VSSlow. The voltage difference lying in the output drivers 3 is VDD in both cases, that is to say VDDhigh−VSShigh=VDDlow−VSSlow=VDD, whereby VDD for example can be up to 6V (usually 5.5V) and therefore lies within the range of normal supply voltages for CMOS semi-conductor components. The voltage difference between VDDhigh and VSSlow can for example be 110V.

Each of the two output drivers 3 is connected on the output side via a first resistor 4 and a second resistor 11 with the terminal A or B of the corresponding wire of the two-wire transmission line. The values of the two resistors 4 are of equal size for reasons of symmetry and correspond in each case to half the value of the internal resistance $R_i$ of the data transmission device. The values $R_2/2$ of the two resistors 11 are also of equal size for reasons of symmetry. The resistors 11 serve to provide the desired input impedance and support lighter protective wiring.

Not only the transmission signal containing the actual required information is emitted by the output driver 3, but additionally also a supply current, which serves to remotely feed the individual subscriber-terminal. A DC voltage drop occurs as a result of this supply current at the series resistors 4 and 11, which must not exceed the limit specified by the particular network operator.

In order to be able to meet both the requirements concerning the maximally admissible DC voltage drop as well as the requirements concerning the internal resistance $R_i$, that is to say the reflection attenuation, in the case of the data transmission device shown the DC-output level, which corresponds to the offset of the transmission signal, is tracked in such a manner, that the DC-voltage does not decrease at the terminals A and B. This corresponds for the DC-signal a negative input resistance (in about the size $R_i/2$ of the series resistor 4). For reasons of stability this negative input resistance should be selected in regard to its reproducibility (tolerance) so that its amount is not greater than the minimum external resistance. The tolerance window of these two resistance values must not therefore overlap.

To track the DC-output level for each of the two line wires i.e. for each output driver 3 a corresponding control circuit is provided. Each control circuit firstly measures the output current, by recording the decreasing voltage in the particular series resistance 4 and converting with the aid of an analog-to-digital (A/D)converter 5 into a corresponding digital measurement signal. Next with the aid a digital low pass filter device 6 digital low pass filtering of the digital measurement signal takes place, as a result of which the DC-offset is separated from the actual transmission signal. The DC-offset therefore existing in the form of the digital output signals of the digital low pass filter device 6 is added with the aid of digital adders 7 to the transmission signal i.e. the individual split signals.

In the case of the embodiment illustrated for the two differential outputs A and B a common low pass filtering is provided in the form of a full-differential control. Naturally however individual digital low pass filtering can be provided for each output A, B.

In FIG. 1 capacitors 9 and 10 are additionally illustrated, which optionally can be used to suppress DC voltage differences. In the case of the embodiment shown in FIG. 1 digital addition of the DC-offset to the transmission signal takes place.

In FIG. 2 an embodiment is illustrated, in the case of which analog addition takes place, whereby those components, which correspond to the components shown in FIG. 1, are provided with the same references. In regard to these components—to avoid repetition—reference is made to the above statements re FIG. 1.

In the case of the embodiment shown in FIG. 2 the digital output signals of the digital low pass filter device 6 are converted with the aid of a D/A-converter 8 into corresponding analog signals, which are then added via the analog adder 7 to the transmission signal i.e. the particular split signals, which are generated by the transmission signal-generating device 1 and given out via a D/A-converter 2.

In FIG. 2 further capacitors 12 are illustrated, which optionally can be used to suppress DC voltage differences.

Naturally these capacitors 12 can also be arranged between the transmission signal-generating device 1 and the D/A-converter 2.

I claim:

1. A data transmission device for generating an output signal to be transmitted via a transmission line, the output signal including a transmission signal and a direct current (DC) supply voltage, comprising:

a first terminal allocated to a first wire of the transmission line;

a second terminal allocated to a second wire of the transmission line;

a first output driver for generating a first split signal to be transmitted via the first wire of the transmission line;

a second output driver for generating a second split signal to be transmitted via the second wire or the transmission line, whereby an alternating current (AC) current-related difference of the two split signals corresponds to the transmission signal;

a first resistor located between an output of the first output driver and the first terminal;

a second resistor located between an output of the second output driver and the second terminal;

a first filter device to separate a first DC supply voltage component from a decreasing voltage measured by a first measurement device and decreasing at the first resistor;

a second filter device to separate a second DC supply voltage component from a decreasing voltage measured by a second measurement device and decreasing at the second resistor;

a first adding device to add a first adding signal corresponding to the first DC supply voltage component to the first split signal fed to the first output driver; and a second adding device to add a second adding signal corresponding to the second DC supply voltage component to the second split signal fed to the second output driver.

2. A data transmission device according to claim 1, wherein the device includes a digital control circuit.

3. A data transmission device according to claim 1, wherein the first and second filter devices are designed in the form of a low pass filter.

4. A data transmission device according to claim 1, wherein the first and second filter devices are designed in the form of a digital filter device, and the decreasing voltage at the first resistor and the decreasing voltage at the second resistor is fed via a analog-to-digital (A/D) converter to the corresponding filter device.

5. A data transmission device according to claim 1, wherein the first and second filter devices are formed by a common filter device, which receives the decreasing voltages at the first and second resistor and independently of these generates the first and second adding signal.

6. A data transmission device according to claim 1, wherein the design of the first and second adding devices is digital, whereby the first or second adding device receives and adds the first or second digital split signal as well as the first or second digital adding signal, and wherein the output signal generated by the first or second adding device is fed via a digital-to-analog (D/A) converter to the first or second output driver.

7. A data transmission device according to claim 1, wherein the design of the first and second adding device is analog, whereby the first or second adding device receives and adds the first or second analog split signal as well as the first or second digital adding signal emitted via a digital-to-analog (D/A) converter in each case, and wherein the output signal generated by the first or second adding device is fed to the first or second output driver.

8. A data transmission device according to claim 1, wherein the value of the first resistor and the value of the second resistor are identical and in each case correspond to half the value of the internal resistance ($R_i$) of the data transmission device.

* * * * *